United States Patent [19]

Bols

[11] Patent Number: 5,212,590
[45] Date of Patent: May 18, 1993

[54] BRIGHTNESS INTENSIFIER TUBE WITH ALIGNMENT MARKER

[75] Inventor: Willy J. P. Bols, Retie, Belgium

[73] Assignee: U.S. Philips Corp., New York, N.Y.

[21] Appl. No.: 746,133

[22] Filed: Aug. 13, 1991

Related U.S. Application Data

[63] Continuation of Ser. No. 527,992, May 23, 1990, abandoned.

[30] Foreign Application Priority Data

May 25, 1989 [NL] Netherlands .......................... 8901306

[51] Int. Cl.⁵ .......................... G02B 23/00; H01J 31/50
[52] U.S. Cl. .................................... 359/400; 359/428; 250/214 VT; 33/241
[58] Field of Search .................................. 350/537-538, 350/508, 319; 250/213 VT, 203.3, 213 R, 458.1, 466.1, 467.1, 483.1-488.1, 491.1; 313/461-462, 472, 525, 530, 541, 544; 356/8, 14, 391, 141-143; 33/241

[56] References Cited

U.S. PATENT DOCUMENTS

| | | | |
|---|---|---|---|
| 4,021,693 | 5/1977 | Bradley et al. | 250/213 VT |
| 4,087,683 | 5/1978 | Lieb | 250/213 VT |
| 4,168,429 | 9/1979 | Lough | 250/467.1 |
| 4,171,480 | 10/1979 | Wulms | 250/213 VT |
| 4,245,160 | 1/1981 | Harao | 250/213 VT |
| 4,286,148 | 8/1981 | Kamps et al. | 250/213 VT |
| 4,417,814 | 11/1983 | Doliber | 250/333 |
| 4,710,875 | 12/1987 | Nakajima et al. | 250/491.1 |
| 4,721,375 | 1/1988 | Van Dulmen | 350/538 |
| 4,743,765 | 5/1988 | Ekstrand | 250/467.1 |
| 4,861,977 | 8/1989 | De la Fonteijne | 250/213 VT |
| 4,877,324 | 10/1989 | Hauri et al. | 356/251 |
| 4,924,080 | 5/1990 | Caserta et al. | 250/213 VT |
| 4,978,195 | 12/1990 | Takano et al. | 250/213 VT |

FOREIGN PATENT DOCUMENTS

| | | |
|---|---|---|
| 1764095 | 4/1971 | Fed. Rep. of Germany . |
| 2382765 | 3/1978 | France . |
| 12673 | 1/1980 | Japan .......................... 250/213 VT |
| 32345 | 2/1983 | Japan .......................... 250/213 VT |
| 1566852 | 5/1980 | Netherlands . |
| 457951 | 9/1936 | United Kingdom . |

*Primary Examiner*—Bruce Y. Arnold
*Assistant Examiner*—Thong Nguyen

[57] ABSTRACT

In a brightness intensifier tube there is provided, preferably in the exit screen or, in the case of a brightness intensifier comprising a channel plate intensifier, on an input electrode thereof, a fixed alignment marker, for example by local burning in of screen material by photoelectrons from the entrance screen which are liberated therefrom by irradiation by a laser beam. For tubes comprising a fixed entrance optical system the alignment marker is preferably provided by focused application of light via the optical system.

4 Claims, 2 Drawing Sheets

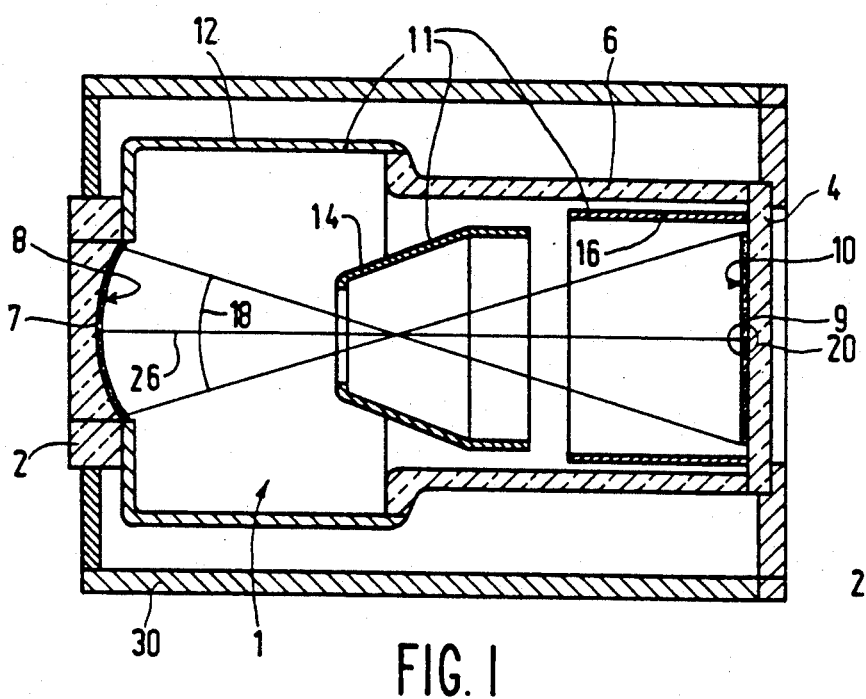
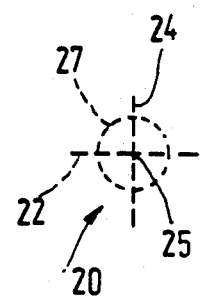
FIG. 1
FIG. 2

BRIGHTNESS INTENSIFIER TUBE WITH ALIGNMENT MARKER

This is a continuation of application Ser. No. 07/527,992, filed May 23, 1990, now abandoned.

BACKGROUND OF THE INVENTION

1. Field of the Invention

The invention relates to a brightness intensifier tube, comprising an entrance screen, an exit screen and an electron-optical system for imaging electrons emanating from the entrance screen onto the exit screen.

2. Description of Related Art

When brightness intensifier tubes or the type referred to above are used in, for example sights, use is made of an alignment marker. From U.S. Pat. No. 4,582,400 it is known to project, using an optical system, an alignment marker of this kind into the optical beam path of a sight comprising a brightness intensifier tube. Furthermore, from U.S. Pat. No. 4,721,375 it is known to arrange a support provided with an alignment marker in the optical beam path of the sight so as to be adjustable therein.

Both solutions have the drawback that the alignment marker must be individually adjusted in each sight and must each time be readjusted after misalignment, for example caused by shocks and the like. For adjustment and readjustment of the alignment marker, therefore, a comparatively expensive optical and mechanical adjustment mechanism, respectively, is required for each sight.

SUMMARY OF THE INVENTION

It is the object of the invention to mitigate this drawback; to achieve this, a brightness intensifier of the kind set forth in accordance with the invention is characterized in that a fixed alignment marker is provided in one of the image-forming screens of the brightness intensifier tube.

Because the alignment marker is fixedly provided in a brightness intensifier tube in accordance with the invention, no mechanical misalignment can occur and an adjusting mechanism for the alignment marker can be dispensed with, the comparatively heavy and expensive optical marker alignment projection system also being superfluous.

In a preferred embodiment the alignment marker is provided in the exit screen of the tube, preferably by burning in the screen material by means of photo-electrons locally liberated from the entrance screen. Illumination of the entrance screen is then realized by way of a strongly focused light beam, preferably a laser beam. In order to prevent future deviations due to the use of a conventional entrance optical system for the tube, marker alignment projection preferably takes place via an entrance optical system to be coupled to the tube. An extremely fine alignment marker can thus be formed on the exit screen so as to be burnt therein under the influence of a sufficiently high local load. In order to prevent the occurrence of potential differences across the exit screen due to the alignment marker, the alignment marker is preferably realized in the form of dots or dotted lines. However, any desirable shape can be imparted to an alignment marker thus provided, for example by utilizing a scanning light beam or a mask.

In order to avoid misorientation, which could occur due to magnetic interference fields influencing the beam of photo-electrons, such as the terrestrial magnetic field or magnetic fields produced by motors and the like, it may be advantageous to include magnetic shielding material in a housing for the tube.

In order to avoid misorientation due to interference fields, in a further preferred embodiment the alignment marker or adjustment marker is provided in the entrance screen of the brightness intensifier tube. This can be realized, for example by local overloading of the photocathode by local exposure to light, by providing an alignment marker in a support or in a further sublayer of the entrance screen etc. Light can again be applied via an entrance optical system to be used at a later stage.

A sight system comprising a brightness intensifier tube with a fixed alignment marker can be substantially smaller, lighter and cheaper because of the absence of an optical system for imaging an alignment marker; moreover, because no optical marker imaging is used, the occurrence of image-disturbing light phenomena is also precluded. An alignment marker in accordance with the invention can be provided in any desirable degree of contrast so that it can be adapted to the specific application of the tube. For implementing the invention it is not important how the brightness intensifier tube is constructed, for example as a diode or as a triode or with or without a channel plate intensifier. In a preferred embodiment for a brightness intensifier provided with a channel plate, the alignment marker is provided on an electrode of the channel plate, preferably on an input electrode thereof, by local heavy loading of said electrode using a potential difference across the channel plate which does not substantially accelerate the electrons.

BRIEF DESCRIPTION OF THE DRAWINGS

Some preferred embodiments in accordance with the invention will be described in detail hereinafter with reference to the drawing.

FIG. 1 is a cross-sectional view of a preferred embodiment of the inventive brightness intensifier tube.

FIG. 2 is an elevation of an alignment marker.

DETAILED DESCRIPTION OF THE PREFERRED EMBODIMENTS

Figure 3:
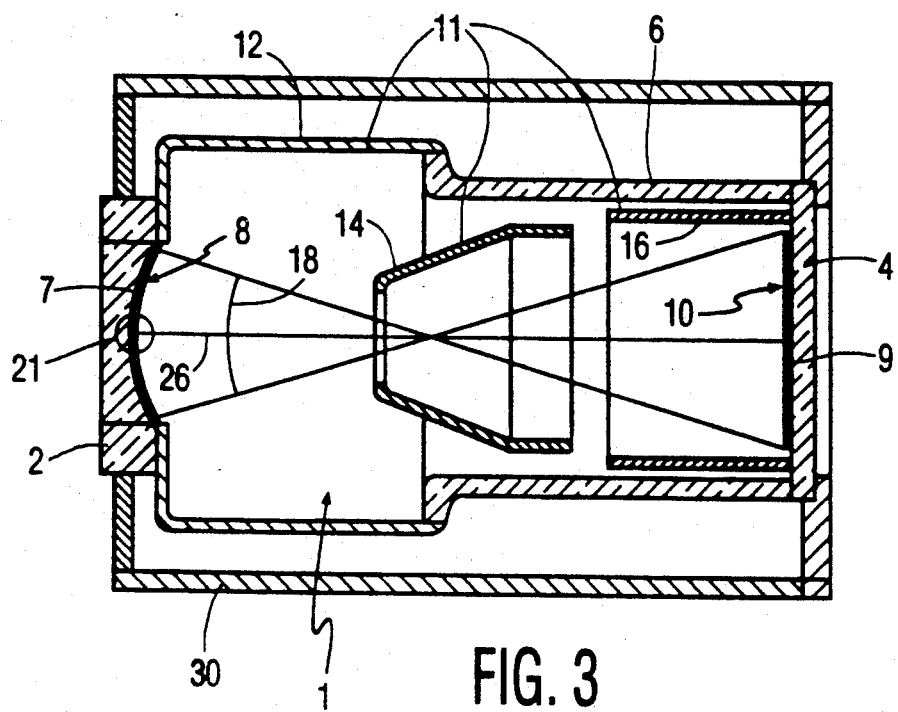
FIG. 3 shows an alignment marker provided on an entrance screen.
Figure 4:
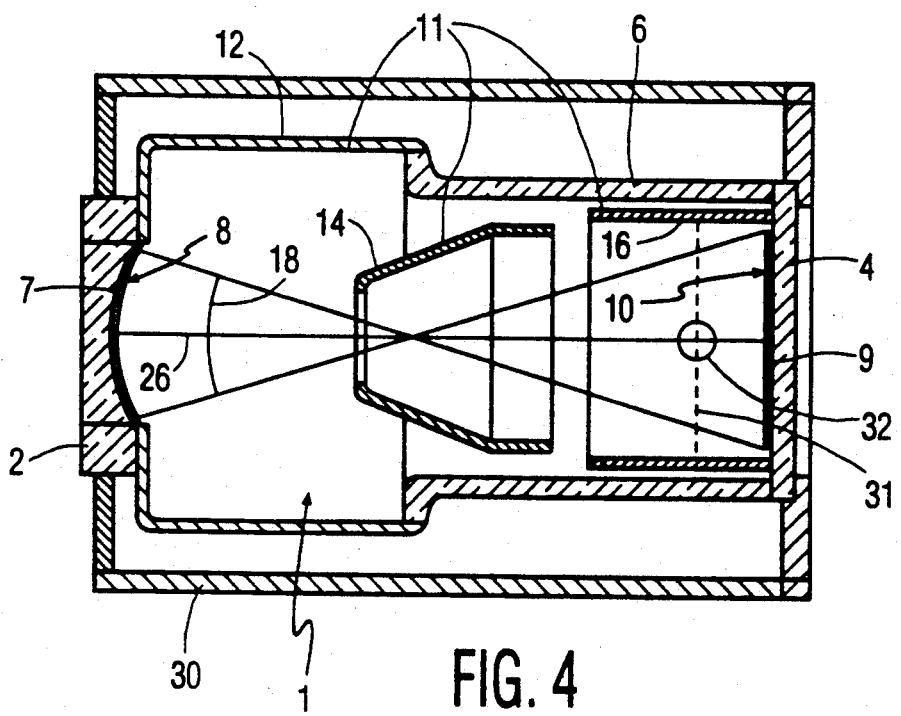
FIG. 4 shows an alignment marker provided on a channel plate.

The FIGS. 1, 3 and 4 of the drawing show a brightness intensifier tube 1, comprising an entrance window 2, an exit window 4 and a cylindrical envelope which interconnects the windows. The entrance window 2 is formed, for example by a fiber-optical plate which supports, on an inner surface 7, an entrance screen 8, for example containing a material which is sensitive to radiation to be detected, for example a photocathode which is sensitive to infrared radiation or visible light. For radiation for which no efficient photocathode is available, a conversion layer may be provided between the entrance window and a photocathode, the radiation to be detected being converted in the conversion layer into radiation for which the photocathe is sensitive. The exit window 4 may also be formed by a fiber-optical plate and in this case supports, on an inner surface 9, an exit screen 10, for example in the form of a phosphor layer for forming an optical image from a photo-electron image. Between the entrance screen 8 and the exit screen 10 there is provided an electron-optical system 11 which in this case comprises an input electrode 12, an intermediate anode 14, and a final anode 16 for imaging a beam of photo-electrons 18 on the exit screen. The input electrode 12 is in this case electrically conductively connected to the photocathode 8, the final anode 16 being electrically conductively connected to the exit screen 10.

In FIG. 1, the exit screen 10 in accordance with the invention is provided with an alignment marker 20. An alignment marker is shown in FIG. 2, for example comprising an x-graduation 22 and an y-graduation 24 on which there may be provided a circle 27, for example around an origin 25 which preferably coincides with an optical axis 26 of the brightness intensifier tube. An alignment marker of this kind can be readily burnt in via photo-electrons liberated by exposing the entrance screen to light. Alternatively, an alignment marker 21 of the type shown in FIG. 2 may be provided in or near the entrance screen 8, as shown in FIG. 3.

The risk of an undesirable potential excursion across the exit screen is avoided by composing the marker of dots or short line segments. Undesirable disturbances of the electron-optical image by electrical and/or magnetic fields can be reduced by accommodating the brightness intensifier tube in a housing 30 which is provided with electrically conductive material and magnetic shielding material for this purpose. For exit screen constructed as a phosphor layer with a detector composed of a matrix of photodetectors, for example for imaging on a monitor, an alignment marker can be provided in the phosphor layer in a fully analogous manner. In that case the exit window 4 need not be transparent to light.

Alternatively, for a brightness intensifier provided with a channel plate, as shown in FIG. 4 by dotted line 31, the alignment marker 32 is provided on an electrode of the channel plate 31.

I claim:

1. A brightness intensifier tube comprising an entrance screen, an exit screen and an electron-optical system for imaging electrons emanating from the entrance screen onto the exit screen wherein the brightness intensifier tube is provided with a channel plate having an input electrode and a fixed alignment marker is provided on the input electrode of the channel plate.

2. A brightness intensifier tube as claimed in claim 1, wherein the alignment marker comprises short line segments or dots.

3. A brightness intensifier tube as claimed in claim 1, wherein a housing of the tube is provided with a magnetic shield material.

4. A brightness intensifier tube as claimed in claim 1 having screen material wherein the alignment marker is provided by burning in the screen material by means of photo-electrons locally liberated from the entrance screen.

* * * * *